No. 768,109. PATENTED AUG. 23, 1904.
F. E. BALLARD, F. A. RANTZ & G. W. COLLIN.
FLUID TANK INDICATOR.
APPLICATION FILED MAR. 10, 1904.
NO MODEL.
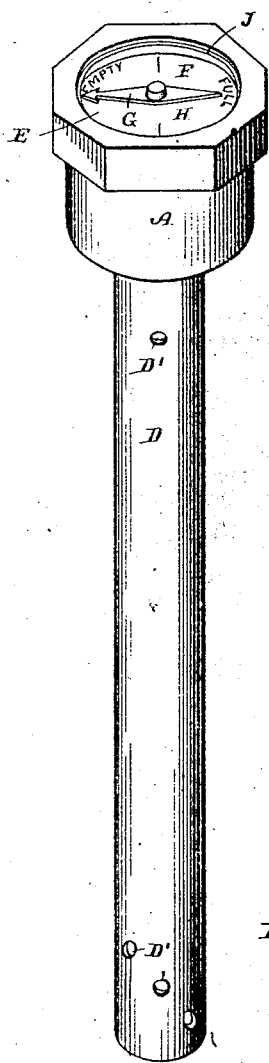
Fig. 1.
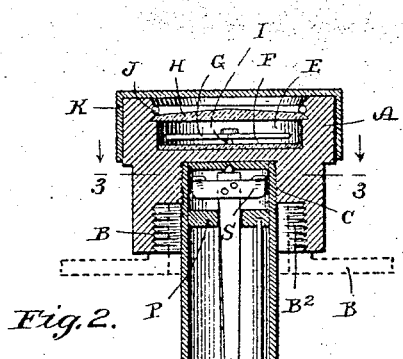
Fig. 2.
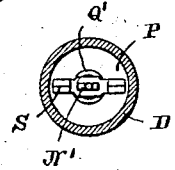
Fig. 3.
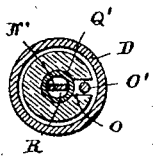
Fig. 4.
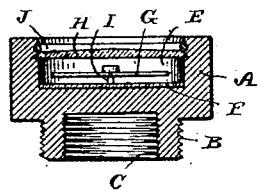
Fig. 5.
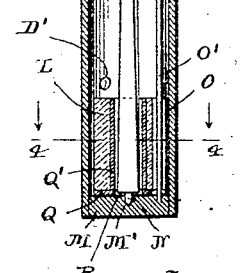
Witnesses
Inventors
Frank E. Ballard
Frank A. Rantz and
George W. Collin
By Chamberlain & Newman
Attorneys No. 768,109. Patented August 23, 1904.

UNITED STATES PATENT OFFICE.

FRANK E. BALLARD, FRANK A. RANTZ, AND GEORGE W. COLLIN, OF BRIDGEPORT, CONNECTICUT.

FLUID-TANK INDICATOR.

SPECIFICATION forming part of Letters Patent No. 768,109, dated August 23, 1904.

Application filed March 10, 1904. Serial No. 197,395. (No model.)

*To all whom it may concern:*

Be it known that we, FRANK E. BALLARD, FRANK A. RANTZ, and GEORGE W. COLLIN, citizens of the United States, and residents of Bridgeport, in the county of Fairfield and State of Connecticut, have invented certain new and useful Improvements in Fluid-Tank Indicators, of which the following is a specification.

Our invention relates to new and useful improvements in fluid-tank indicators such as are used to show externally the amount of fluid within a tank, and is especially applicable to gasolene-tanks of the kind employed on automobiles or other vehicles.

Fluid-tanks, and especially automobile gasolene-tanks, are provided with a circular filling-hole, which generally consists of a threaded opening and is provided with a threaded plug or cap to close the same.

Our device in part comprises and consists of a circular non-magnetic cap or plug for performing the same office and, further, provided with novel indicator parts. The size and character of these openings on the various makes of machines vary slightly. Consequently the difference in size can be easily compensated for with but slight change in size of one part only of our indicator.

It is the object of this invention to provide a commercial indicator which shall be so constructed that it may be attached to the above-described opening of tanks without the necessity of reconstructing the same; further, to construct the device in such a way that it may be manufactured, assembled, and shipped with little or no possibility of being damaged, broken, or disarranged during transit and shall be in readiness for attachment and operation in such tanks immediately; to produce an indicator that will not be materially affected by the shaking movement of the fluid in a tank when the machine is in use, but which shall be steady and reliable in its operation; finally, to provide an indicator for fluid-tanks of the above class which will be simple in construction, inexpensive to manufacture, and well adapted to use upon old tanks as well as new ones.

With the above objects in view our invention resides and consists in the novel construction and arrangements of parts shown upon the accompanying sheet of drawings, forming a part of this specification, upon which similar characters of reference denote like or corresponding parts throughout the several figures, and of which—

Figure 1 shows a perspective view of our improved indicator detached from a tank. Fig. 2 shows a central vertical longitudinal sectional view through the indicator, the position of the operative parts agreeing with those of Fig. 1, which represents their normal position. Fig. 3 is a transverse cross-section through the tube, taken on line 3 3 of Fig. 3, illustrating the magnet and its pivotal shaft. Fig. 4 is a similar cross-section taken on line 4 4 of Fig. 2, showing the cork float in plan view; and Fig. 5 shows a modified form of plug for closing an internally-threaded filling-opening.

In Fig. 2 of the accompanying drawings we have indicated by dotted lines a small portion of the top of a tank B', including the filling-opening B'', which we believe is sufficient for the purpose of illustrating our device, since the tank itself forms no part of the invention.

The invention as constructed is designed to show upon an external dial the height of fluid within the tank upon which it is attached. This dial can be laid out into halves, quarters, and eighths or may be divided to indicate the quantity of fluid and gallons and the like, as may be preferred, and, further, comprises a needle, shaft, a float, and tube, all of which will now be more particularly described.

Referring in detail to the reference characters marked upon the drawings, A represents an unperforated non-magnetic cover having a thread B for attachment to the filling-opening of tanks and whereby it may be used in lieu of the caps or plugs which are ordinarily employed for closing said openings and in a way to insure a quick and convenient form of fitting the indicators to tanks regularly manufactured and now found upon the market. This cover is further provided with a small bore C, central of the under side, threaded to receive a tubular casing D, which tube is preferably made of a uniform diameter, attachable and detachable to and from said cover to permit of the interchanging of longer or shorter tubes, as may be required, to accommodate tanks of different depths to fit covers of different sizes and with either internal or external threads B, as seen in Figs. 2 and 5, to accommodate varying sized and kinds of openings. The top of this cover is bored out to form a chamber E, in which is located a dial F and a needle G, the latter being loosely mounted upon a post I in the usual manner of compass-needles. This needle and its dial are inclosed by a glass or crystal H, which is held in place by a circular spring-wire J. A cap K, of a suitable character and dimension, may be used to inclose this crystal and cover, if desired, in substantially the way indicated in Fig. 2.

The needle before mentioned is operated by a magnet by the rise and fall of a float L, which is housed within a tubular casing D. The purpose of housing the float in the manner indicated is to provide a protection to the same during shipment and handling and, further, to prevent any excessive movement of the float and its associate parts from the splashing or shaking of the fluid in the tank.

The tube is provided with a series of holes D' to admit the fluid sufficiently free to properly operate the float, but not free enough to allow the splash of the fluid to materially affect said float within the tube. This casing is further provided with closed ends M, each containing a central pivotal recess M' to receive the pivotal pins N of the spiral shaft N' and upon which shaft the float is mounted. The float in question is preferably made of cork, being cut away on one side, as shown at O in Fig. 4, to loosely receive the guide-rod O', parallel with said shaft, one end of which rod is secured to the lower end of the tube and the other end in the bridge P, secured in the upper end of the tube, as is clearly shown in Fig. 2, and in a way to hold the float against rotary movement. The float is further provided with a metallic end Q, having a rectangular opening R to receive the spiral shaft in a way to insure its turning with the rise and fall of the float. A central shell Q' is also preferably secured within the float to prevent the engagement of the cork with the spiral shaft and insure the free and proper operation of the same within the float, as is obviously necessary. To the upper end of this shaft is secured a magnet S, which is designed to be rotated with the shaft by the rise and fall of the float. The purpose and function of this magnet is to influence and draw the points of the needle around upon its pivot and in juxtaposition thereto in a way to indicate upon the dial the position of the float and quantity of fluid within the tank therewith, as is clearly illustrated in the drawings.

As will be apparent, the needle is physically unconnected from the shaft or magnet, but is attracted thereby through the unperforated closure, which latter positively prohibits any possible escape of fluid or gases therefrom.

From the foregoing description it will be seen that the construction is comparatively simple and that the device is operated solely by the rise and fall of the float, which is free to move up and down with the changing heights of fluid, but is held against rotatory movement by its engagement with the guide-rod. The turning of the spiral shaft carries around the magnet, and this in turn influences the needle, which indicates upon the dial variations in the level of the fluid.

Having thus described our invention, what we claim, and desire to secure by Letters Patent, is—

1. In an indicator, the combination with a portion of a fluid-tank provided with a circular opening, of an imperforate non-magnetic cover for said opening, a perforated casing removably attached to said cover, a movable magnetic portion mounted within said casing, a float connected with said magnetic portion to move the same, a second movable magnetic portion physically unconnected with said first portion and mounted outside of said tank in juxtaposition to said inside portion, one of said portions consisting of a magnet whereby said outside portion is caused to take positions corresponding to the positions of said inside portion and thereby indicate variations in the level of the fluid of said tank.

2. In an indicator, the combination with a portion of a fluid-tank provided with a circular opening, of an imperforate non-magnetic cover for said opening, a movable magnetic portion within said tank pivotally mounted on said cover, a float within said tank and connected with said magnetic portion to move the same, a perforated casing inclosing said float and magnetic portion adapted to be inserted in said tank through said hole together with the parts contained therein, a second magnetic portion physically unconnected with said first portion and pivoted on the outside of said cover, in juxtaposition to said inside portion, one of said portions consisting of a magnet whereby said outside portion is caused to take positions corresponding to the positions of said inside portion and thereby indicate variations in the level of the fluid of said tank.

3. In an indicator, the combination with a portion of a fluid-tank provided with a circular opening, of an imperforate non-magnetic cover for said opening, a magnetic portion mounted on the outside of said cover, a perforated tubular casing threadably attached to said cover and adapted to be inserted through said filling-opening, a second magnetic portion physically unconnected with said first portion and pivoted within the tubular casing in juxtaposition to said outside portion, a float within the casing and connected with said second magnet in a manner to rotate the same and cause the outside portion to take positions corresponding to said inside portion and thereby indicate variations in the line of the fluid in said tank.

Signed at Bridgeport, in the county of Fairfield and State of Connecticut, this 27th day of February, A. D. 1904.

FRANK E. BALLARD.
FRANK A. RANTZ.
GEORGE W. COLLIN.

Witnesses:
C. M. NEWMAN,
W. V. DEVITT.